United States Patent [19]
Abe et al.

[11] Patent Number: 5,790,505
[45] Date of Patent: Aug. 4, 1998

[54] OPTICAL DATA RECORDING/ REPRODUCING METHOD AND APPARATUS FOR DETERMING AN OPTIMUM RECORDING POWER

[75] Inventors: Michiharu Abe, Kanagawa; Hiroko Iwasaki, Tokyo, both of Japan

[73] Assignee: Ricoh Company, Ltd., Tokyo, Japan

[21] Appl. No.: 712,253

[22] Filed: Sep. 11, 1996

[30] Foreign Application Priority Data

Sep. 11, 1995 [JP] Japan ................................ 7-232546
Apr. 10, 1996 [JP] Japan ................................ 8-088095

[51] Int. Cl.$^6$ ...................................... G11B 7/00
[52] U.S. Cl. ...................................... 369/116
[58] Field of Search ............................ 369/116, 32, 58, 369/124, 47, 48

[56] References Cited

U.S. PATENT DOCUMENTS

| | | | |
|---|---|---|---|
| 4,283,785 | 8/1981 | Miyauchi et al. | 369/116 |
| 5,050,156 | 9/1991 | Barton | 369/116 |
| 5,268,893 | 12/1993 | Call et al. | 369/116 |
| 5,495,466 | 2/1996 | Dohmeier et al. | 369/116 |
| 5,602,814 | 2/1997 | Jaquette et al. | 369/116 |
| 5,608,710 | 1/1995 | Minemura et al. | 369/116 |
| 5,640,381 | 6/1997 | Call et al. | 369/116 |

FOREIGN PATENT DOCUMENTS

| | | |
|---|---|---|
| 0 587 111 | 3/1994 | European Pat. Off. . |
| 63 29336 | 6/1988 | Japan . |

WO 93/26001 12/1993 WIPO .

OTHER PUBLICATIONS

Patent Abstracts of Japan, vol. 18, No. 665, (P–1844), Dec. 15, 1994, JP 6 259769, Sep. 16, 1994.
Patent Abstracts of Japan, vol. 18, No. 618, (P1831), Nov. 24, 1994, JP 6 231463, Aug. 19, 1994.

*Primary Examiner*—Nabil Hindi
*Attorney, Agent, or Firm*—Oblon, Spivak, McClelland, Maier & Neustadt, P.C.

[57] ABSTRACT

An optical data recording/reproducing method in which data is recorded for testing in a pattern including a not-recorded section and a recorded section as changing a recording power P onto an optical data recording medium from time to time. An amplitude m of the recorded data corresponding to the recording power P is monitored by reproducing the data recorded for testing. A standardized gradient g(P) is calculated from the following expression:

$$g(P)=(\Delta m/m)/(\Delta P/P)$$

or h(P) is calculated from the following expression:

$$h(P)=(\Delta m/m)/\Delta P$$

wherein ΔP indicates a minute change rate near P and Δm indicates a minute change rate corresponding to ΔP near m, and an optimum recording power is decided and set by evaluating whether the recording power is too high or too low according to the standardized gradient g(P) or h(P).

31 Claims, 4 Drawing Sheets

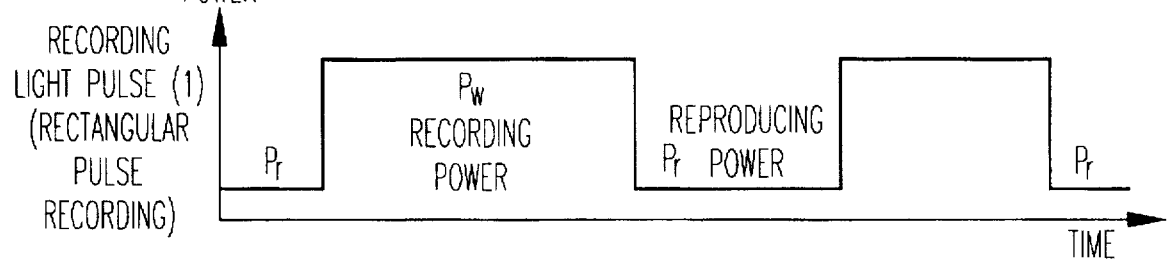
FIG. 2A
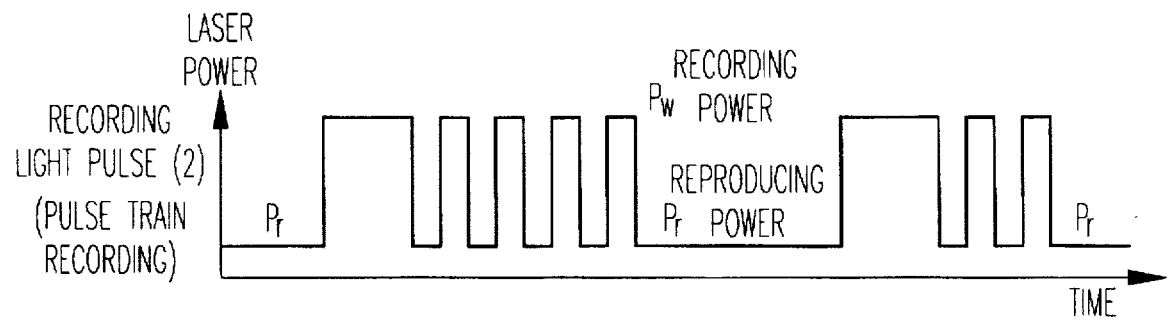
FIG. 2B
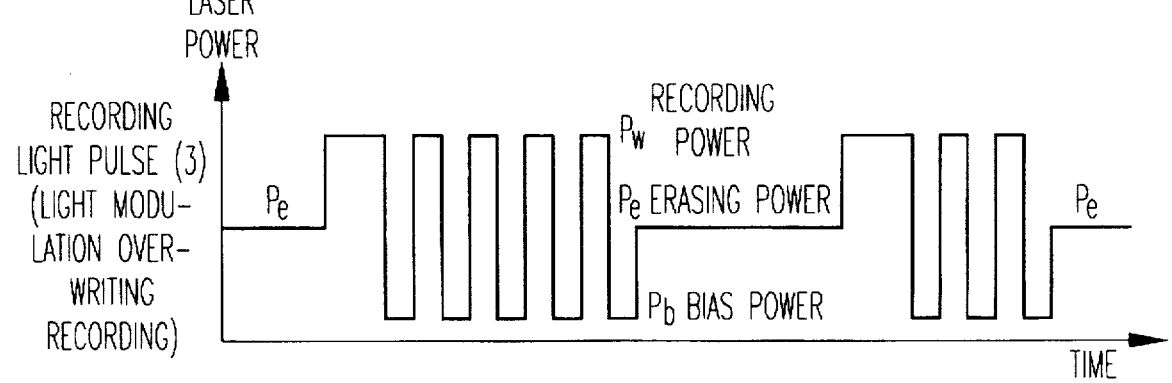
FIG. 2C
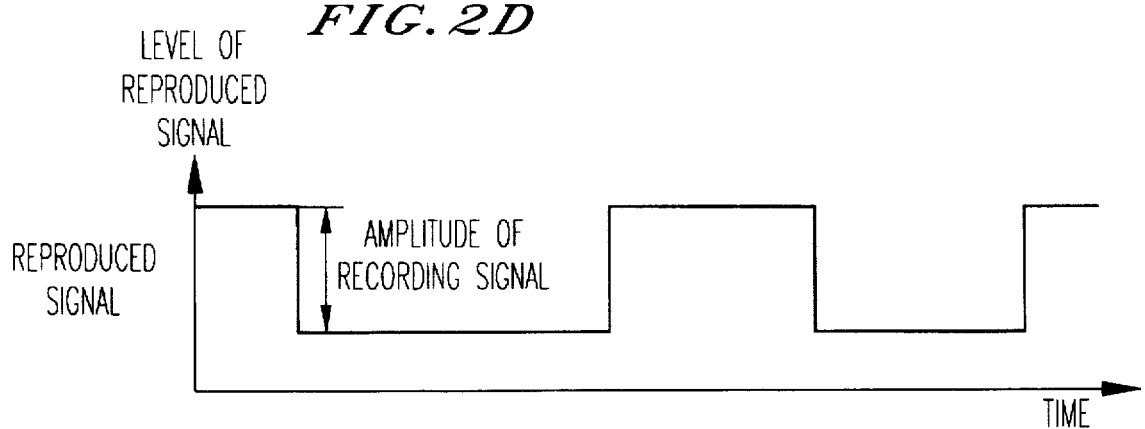
FIG. 2D
FIG. 2E

OPTICAL DATA RECORDING/ REPRODUCING METHOD AND APPARATUS FOR DETERMING AN OPTIMUM RECORDING POWER

BACKGROUND OF THE INVENTION

1. Field of the Invention

The present invention relates to an optical data recording/reproducing method and apparatus and a method for setting the optical recording power thereof.

2. Discussion of the Background

There is known a method for recording data signals in an optical data recording medium for use in an optical data recording/reproducing apparatus by irradiating a light spot such as a laser beam onto an optical data recording medium and for scanning and modulating the amplitude of a light spot such as a laser beam with data signals as described in Japanese Patent Publication No. 29336/1988. There is also a known a method for adjusting recording conditions such as a recording power or a recording light pulse to optimum values by way of reproducing data signals recorded in an optical data recording medium and monitoring an amplitude of the reproduced signals or a length of recording marks.

With any of the technologies as described above, as a matter of fact it is impossible due to the reasons described below to always set optimum conditions even though data signals are actually recorded using an optical data recording/reproducing apparatus produced in mass.

Namely, as an example of the method described above, the method can be enumerated in which an optimum recording power is set to each optical data recording/reproducing apparatus by monitoring an amplitude of the recording signal (a difference between a level of a signal from a not-recorded section and that of a signal from a recorded section), which is a representative reproduced signal in an optical data recording medium. However, an amplitude value of the recording signal changes according not only to a recording power, but also to a number of openings in an optical pickup, rim intensity (distribution of intensity of an incident laser beam to a focusing lens), a size and a form of each light spot, and contamination of the optical system associated with passage of time. Further, there is generally an offset (e.g., change or error) of 20% to 40% between each optical pickup, so that a set value is largely changed from the optimum one because of the effect of the offset or error described above.

So in an optical data recording/reproducing apparatus designed for mass production, it is extremely difficult to set an optimum recording power with a precision acceptable in actual use (around ±5%). Also there is nonuniformity between individual optical data recording/reproducing apparatuses and an amplitude of the recording signal for the same recording power can not be a constant level, and in this case, minute adjustment of a recording power is required for each optical data recording/reproducing apparatus. Therefore, there is a problem in production of the optical data recording/reproducing apparatus.

Moreover, especially in a repeatedly rewritable optical data recording medium, a test recording is executed in a data track and then an optimum recording power is set. After that, the test data can be erased and a new data can be recorded, or a new data can be overwritten directly in the track in which the test recording is executed. So, though a data track exclusive for testing need not be formed as the write-once type optical data recording medium, it is not prevented that the recording power of the test recording is excessively increased and the data track is damaged. Therefore, as a matter of fact, the data track exclusive for testing need be formed, and there are disadvantages that a setting error of an optimum recording power is enlarged due to a difference of recording characteristic which is due to a position difference of each data track, or the data track exclusive for testing is in vain for a user.

SUMMARY AND OBJECTS OF THE INVENTION

Accordingly, one object of the present invention is to provide an optical data recording/reproducing method and apparatus which can set an optimum recording power without an effect of offset of a recording power and/or an amplitude of a recording signal.

Another object of the present invention is to provide an optical data recording/reproducing method and apparatus which can easily set an optimum recording power with a precision acceptable in actual use in an optical data recording/reproducing apparatus designed for mass production.

These and other objects and advantages are achieved by the present invention which provides an optical data recording/reproducing method wherein data is recorded for testing in a pattern including a not-recorded section and a recorded section and changing a recording power P onto an optical data recording medium from time to time, an amplitude m of the recorded data corresponding to the recording power P is monitored by reproducing the data recorded for testing, a standardized gradient g(P) is calculated from the following expression:

$$g(P)=(\Delta m/m)/(\Delta P/P)$$

or h(P) is calculated from the following expression:

$$h(P)=(\Delta m/m)/\Delta P$$

wherein $\Delta P$ indicates a minute change rate near P and $\Delta m$ indicates a minute change rate corresponding to $\Delta P$ near m, and an optimum recording power is decided and set by evaluating whether the recording power is too high or too low according to the standardized gradient g(P) or h(P).

BRIEF DESCRIPTION OF THE DRAWINGS

In describing the preferred embodiments of the present invention illustrated in the drawings, specified terminology is employed for the sake of clarity. However, the invention is not intended to be limited to the specific terminology so selected, and it is to be understood that each specific element includes all technical equivalents which operate in a similar manner.

A more complete appreciation of the present invention and many of the attendant advantages thereof will be readily obtained as the same becomes better understood by reference to the following detailed description, particularly when considered in connection with the accompanying drawings, wherein:

FIGS. 2(a)–2(e) show examples of recording light pulses used in the optical data recording/reproducing apparatus of embodiments of the present invention;

DESCRIPTION OF THE PREFERRED EMBODIMENT

Figure 1:
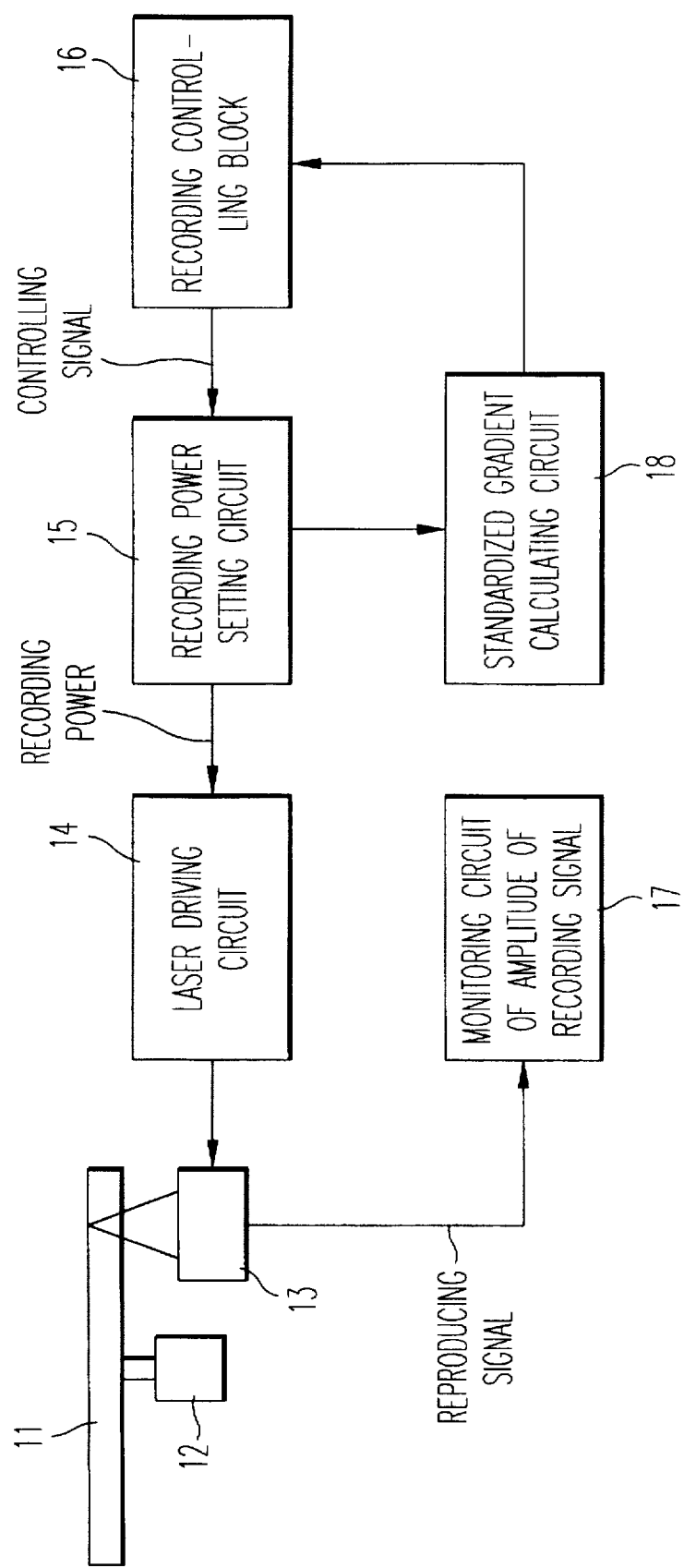
FIG. 1 is a block diagram showing an optical data recording/reproducing apparatus of the present invention.

Referring now to the figures, embodiments of the invention will be described. In the embodiments, a rewritable optical disk, optical card or optical tape, etc. is an optical data recording medium which can be used in the present invention, and the present invention can apply to an optical data recording/reproducing method and apparatus which executes laser ablation recording or laser thermal deformation recording onto pigment, metal or alloy film, magneto-optic recording, phase change recording which changes reflection ratio or phase of light, etc.

Moreover, in these embodiments, as an irradiation method of a recording light, a proper method for a recording medium and a recording signal can be used, for instance an irradiation method of long and short rectangular pulse lights or that of intermittent short pulses of light which are already known. FIGS. 2(a)–2(e) show examples of recording light pulses used in the optical data recording/reproducing apparatus of the embodiments. FIG. 2(a) shows an example of data which is to be recorded and recording sections 1 and 3, and not-recording section 2 are recorded onto a data track in the optical data recording medium.

The data recorded onto this optical data recording medium is reproduced, and as shown in FIG. 2(e) a difference between a signal level from the recording section and a signal level from the not-recording section, that is an amplitude of the recording signal, is detected. This amplitude of the recording signal can be generated by a difference reflection ratio between the recording section and the not-recording section in the optical data recording medium or a difference of intensity of a light to which the Kerr rotation angle is converted by an optical process in the magnet-optic recording.

FIG. 2(b), FIG. 2(c) and FIG. 2(d) show representative examples of recording light pulses which are applied to the present invention. The example in FIG. 2(b) is the most simple one in which modulation is executed by corresponding a weak reproducing power Pr and a strong recording power Pw to the not-recording section and the recording section, respectively. It is suitable for recording data onto a recording surface of low heat conduction. The example in FIG. 2(c) is that of a long recording section which is recorded by a pulse train and it is suitable for recording data onto a recording surface of high heat conduction by a constant recording width.

The example in FIG. 2(d) is one of recording pulses that record data onto a recording surface where overwriting is possible in magneto-optic recording or phase change recording. In a data track where data is already recorded, light of an erasing power Pe of a middle level is continuously irradiated and therefore a not-recording section is formed. A recording power P and a bias power Pb are irradiated by turns and therefore old data is erased and new data is replaced therefor.

Next, a description of the background of the invention is set forth. When an amplitude mo of a standard recording signal (the small zero indicating a standard signal) monitored by a standard data recording/reproducing apparatus and a standard recording power Po are given through the following expression:

$$m_0 = m_0(P_0), \tag{1}$$

a ratio $g_0(P_0)$ obtained by furthermore standardizing $\Delta m_0$ and $\Delta P_0$ corresponding to $m_0$ and $P_0$ respectively by $m_0$ and $P_0$ is expressed by the following expression as a function of $P_0$ $$g_0(P_0) = (\Delta m_0/m_0)(\Delta P_0/P_0). \tag{2}$$

Herein $g_0(P_0)$ indicates a standardized gradient of $m_0$ against $P_0$, and is called a "standardized gradient".

An advantage of using this "standardized gradient" consists in the point that it is applicable also to a relation between an amplitude m of a general recording signal and a general recording power P which are each offset from the respective standard by a constant value according to the following expressions:

$$m(P) = km_0(P), \tag{3}$$

$$P = qP_0 \tag{4}$$

where k and q are non-zero constants. As clearly understood from the following expressions:

$$\begin{aligned} g(P) &= (\Delta m/m)/(\Delta P/P) & (5) \\ &= \{\Delta(km_0)/(km_0)\}/\{\Delta(qP_0)/(qP_0)\} & (6) \\ &= (\Delta m_0/m_0)/(\Delta P_0/P_0) & (7) \\ &= g(P_0), & (8) \end{aligned}$$

so far as the standardized gradient g(P) is monitored, a value equal to the standard value $g_0(P_0)$ can always be obtained.

In other words, a value of g(P) is a numerical value stored irrespective of whether m and P are offset or not, and for this reason it may be said that the numerical value (as determined using the gradient function) always and accurately indicates whether a recording power is too high or too low. Accordingly, by setting a recording power P for recording data so that the standardized gradient value g(P) is obtained in the data recording/reproducing apparatus, even if data is recorded with a different data recording/reproducing apparatus, data can always be recorded in the same recording conditions, which is quite convenient for applications in industrial fields where importance is put on reproductivity of recorded data.

Naturally, as a value of a recording power becomes larger, a value of m becomes saturated and generally g(P) converges to zero. For this reason, to more accurately detect whether a recording power is too high or too low, it is efficient to set a value of g(P) in a range from 0.2 to 2.0, and more preferably in a range from 0.7 to 1.7 and get an optimum recording power by multiplying a value of P corresponding to this by a value in a range from 1.0 to 1.7, preferably in a range from 1.0 to 1.5. The range can include 1.0 or include only values which are greater than 1.0, if desired.

Next, a method of obtaining a standardized gradient g is explained.

The general expression for calculating a standardized gradient g as explained above with respect to equation (5) is as follows:

$$g(P) = (\Delta m/m)(\Delta P/P)$$

wherein ΔP is a minute change rate near p, and Δm indicates a minute change rate corresponding to ΔP near m.

A practical expression for calculating a standardized gradient when recording powers for i-th and (i−1)-th test recording are P(i) and P(i+1) respectively, and amplitudes of recording signal are m(i) and m(i+1) respectively, is as follows:

$$g[\{(P(i) + P(i + 1)\}/2] = [\{m(i + 1) - m(i)\}/\{m(i + 1) + \qquad (9)$$
$$m(i)\}]/[\{P(i + 1) - P(i)\}/\{P(i + 1) + P(i)\}].$$

Another practical expression for computing a standardized gradient g is, when recording powers for (i−1)th, i-th, and (i+1)th test recording are P(i−1), P(i) and P(i+1) respectively, and amplitudes of recording signal are m(i−1) m(i), and m(i+1) respectively, and at the same time when P(i)={P(i+1)+P(i−1)}/2, is as follows:

$$g(i)=[\{m(i+1)-m(i-1)\}/\{(m(i+1)+m(i-1)\}]/[\{P(i+1)-P(i-1)\}/\{(P(i+1)+P(i-1)\}]. \qquad (10)$$

FIG. 1 is a block diagram showing an optical data recording/reproducing apparatus of embodiments of the present invention. In this embodiment, an optical data recording medium 11 such as an optical disk is driven by a driving device 12 such as a spindle motor. An optical source such as a semiconductor laser is driven by a laser driving circuit 14 of an optical source driving device and irradiates light onto the optical data recording medium 11 by way of an optical system not shown in the figure, and therefore a recording/reproducing pickup 13 records and reproduces a data.

A recording power setting circuit 15 of a recording power setting device is controlled by a recording controlling block 16 of a recording controlling device which controls overall system functions and sets a recording power for testing and an optimum recording power. Namely, the recording controlling block 16 sets the recording power for testing and the optimum recording power through the recording power setting circuit 15, the laser driving circuit 14 and the recording/reproducing pickup 13. The laser driving circuit 14 drives the semiconductor laser to emit at the recording power for testing or the optimum recording power which is set by the recording power setting circuit 15.

During a recording power setting mode, the laser driving circuit 14 drives the laser in the recording/reproducing pickup 13 records a pattern of a not-recording section and a recording section onto the optical data recording medium 11 for the recording for testing and changes the recording power P from time to time and reproduces the data of the pattern therefrom.

A monitoring circuit 17 which monitors the amplitude of the recording signal monitors an amplitude m of recording signal corresponding to the recording power P, which is a difference between a signal level of the not-recording section and that of the recording section, from a reproducing signal which is reproduced by the recording/reproducing pickup 13. A standardized gradient calculating circuit 18 of a calculating device seeks by the recording power P, the amplitude m of recording signal monitored in the monitoring circuit of amplitude of recording signal 17 and by equation (5) set forth above which is:

$$g(P)=(\Delta m/m)(\Delta P/P)$$

wherein ΔP is a minute change rate near p, and Δm indicates a minute change rate corresponding to ΔP near m.

The recording controlling block 16 decides the optimum recording power on the basis of the standardized gradient g(P) calculated by the standardized gradient calculating circuit 18, and sets the optimum recording power in the recording power setting circuit 15.

During a recording mode, the laser driving circuit 14 drives the laser in the recording/reproducing pickup 13 to emit at the optimum recording power set by the recording power setting circuit 15 and the recording/reproducing pickup 13 records data onto the optical data recording medium 11 at the optimum recording power. During a reproducing mode, the laser driving circuit 14 drives the laser in the recording/reproducing pickup 13 to emit at a reproducing power and the recording/reproducing pickup 13 reproduces the data from the optical data recording medium 11 by a light of the reproducing power.

Figure 3:
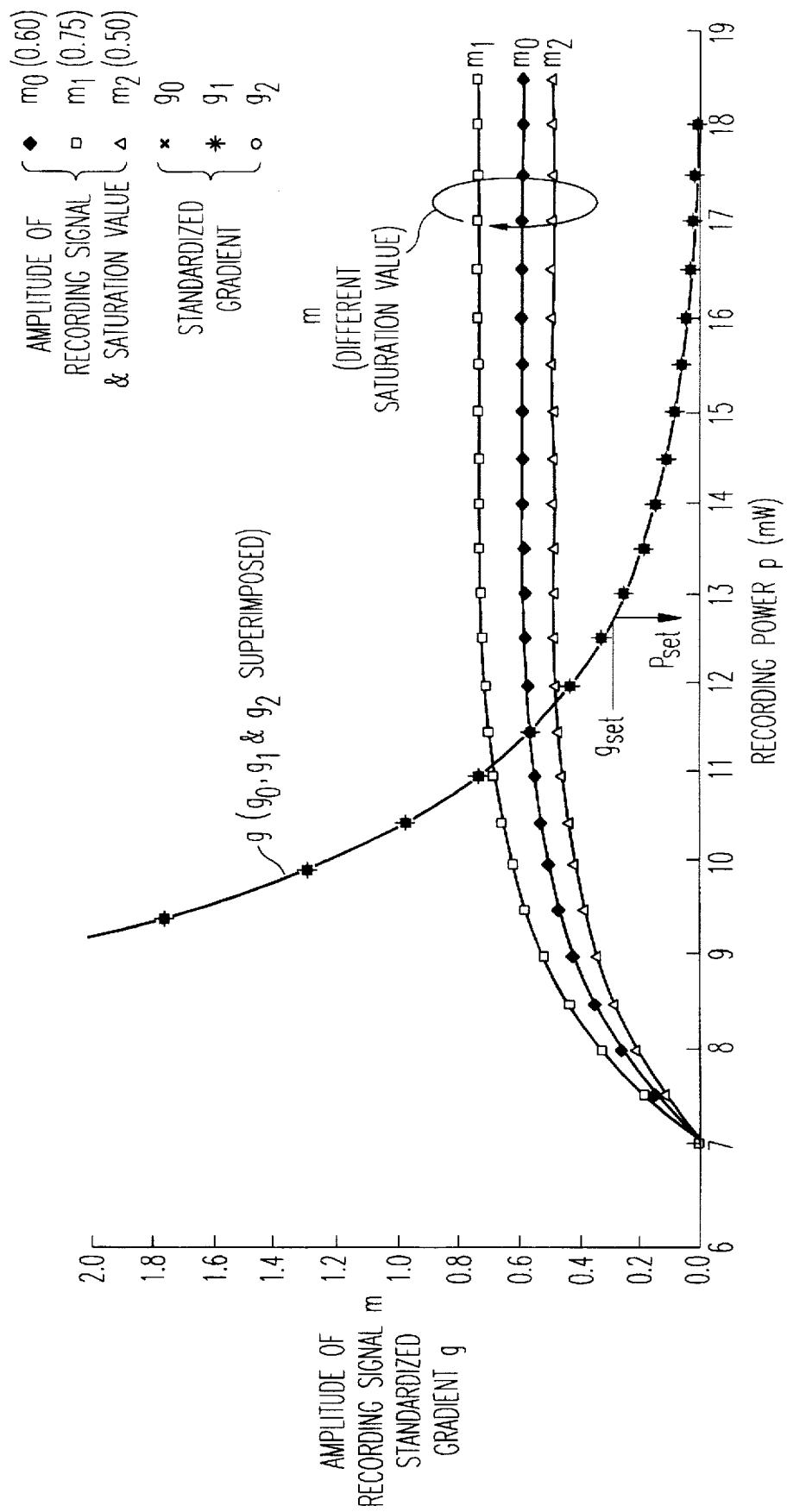
FIG. 3 shows an example of effects in embodiments of the present invention.

FIG. 3 shows an example of the effects provided by this embodiment of the invention. Relations between the amplitude m of recording signal recorded and reproduced by three different types of data recording/reproducing apparatuses and the recording power P are as shown in FIG. 3, and a saturation value of the amplitude of the recording signal in each case is different: 0.60, 0.75, and 0.50 respectively, so that different curves m(0), m(1) and m(2) are provided, and in this case an uniform target of optimum recording power cannot be obtained even with reference to a certain amplitude level of recording signal, and nonuniformity is generated in response to the curves m(0), m(1) and m(2). Furthermore if P is larger than 12 mW (P>12 mW), the three curves m(0), m(1) and m(2) are almost parallel to each other, so that it is impossible even to set a common reference for the amplitude level of the recording signal.

As for the relation between a standardized gradient g and a recording power P in the embodiment of the invention, the curves g(0), g(1), and g(2) obtained by computing through the expression for definition above are completely coincided to each other. For this reason, in the recording control block 16, if a recording power Pset which gives a determined level, for instance g(Pset)=0.25, by using the curve for the standardized gradient g, even if data recording/reproducing apparatuses used are different, an unified recording power Pset can be set without nonuniformity. In other words, this indicates excellent effects provided in the embodiment of the invention, and also indicates that the versatility and precision in recording power setting are very high.

In this embodiment, it is possible to accurately set an optimum recording power by recording data for testing in an optical data recording medium in which data can be recorded, and also it is possible to record a data in an erasable optical data recording medium without damaging a recording film by irradiating an excessive recording power, and furthermore it is possible to make larger the time of erasing and also to improve the reliability of recorded data. In addition, there occurs no nonuniformity such as different amplitude levels of the recording signal even if an identical recording power is used for various types of optical data recording/reproducing apparatuses, an optimum recording power can automatically be set without being affected by nonuniformity between various types of data recording/ reproducing apparatus, and a low cost optical data recording/reproducing apparatus can be provided.

As described above, in the data recording/reproducing method of the embodiment of the invention, data is recorded for testing in patterns each including a not-recorded section and a recorded section and there is a changing of a recording power P from time to time to the data recording medium, the data recorded for testing is reproduced and an amplitude m of the recording signal corresponding to a recording power P is monitored, a standardized gradient g(P) is obtained through equation (5) discussed above which is:

$$g(P)=(\Delta m/m)(\Delta P/P)$$

wherein ΔP is a minute change rate near P and Δm is a minute change rate corresponding to ΔP near m. An optimum recording power is decided and set by checking whether a recording power is too high or too low according to the standardized gradient g(P), so that an optimum recording power can be set without an effect of both offsets of an amplitude m of recording signal and a recording power P which occur easily in plural optical data recording/reproducing apparatuses and especially it is easy to set an optimum recording power with a precision acceptable in actual use in an optical data recording/reproducing apparatus designed for mass production.

A second embodiment of the invention will be described. In the data recording/reproducing apparatus of this embodiment, a recording/reproducing pickup 13 which records/reproduces data for testing in patterns each including a not-recorded section and a recorded section as changing a recording power P from time to time to/from the optical data recording medium 11, a laser driving circuit 14 of an optical source which drives the optical source in this recording/reproducing pickup 13, a recording power setting circuit 15 of a recording power setting device which sets a recording power for testing and an optimum recording power in the recording/reproducing pickup 13, a monitoring circuit 17 which monitors an amplitude m of recording power corresponding to the recording power from the recording/reproducing pickup 13, a standardized calculating circuit 18 of a calculating device which seeks a standardized gradient g (P) by the recording power P for testing, the amplitude m of the recording signal using equation (5) discussed above which is:

$$g(P)=(\Delta m/m)(\Delta P/P),$$

wherein ΔP is a minute change rate near P and Δm is a minute change rate corresponding to ΔP near m. A recording controlling block 16 of a recording controlling device which decides an optimum recording power by checking whether a recording power is too high or too low according to the standardized gradient g(P) sought in the standardized calculating circuit 18 and sets it to the recording power setting circuit 15 are included, so that an optimum recording power can be set without an effect of both offsets of the amplitude m of recording signal and the recording power P which occur easily in plural optical data recording/reproducing apparatuses. This allows the setting of an optimum recording power with a precision acceptable in actual use in an optical data recording/reproducing apparatus designed for mass production.

In the embodiment as described above, the recording controlling block 16 detects a recording power Ps at which the standardized gradient g(P) coincides with a specific value S which is selected in a range from 0.2 to 2.0, and it sets an optimum recording power to the recording power setting circuit 15 by multiplying Ps by a value in a range from 1.0 to 1.7.

Figure 4:
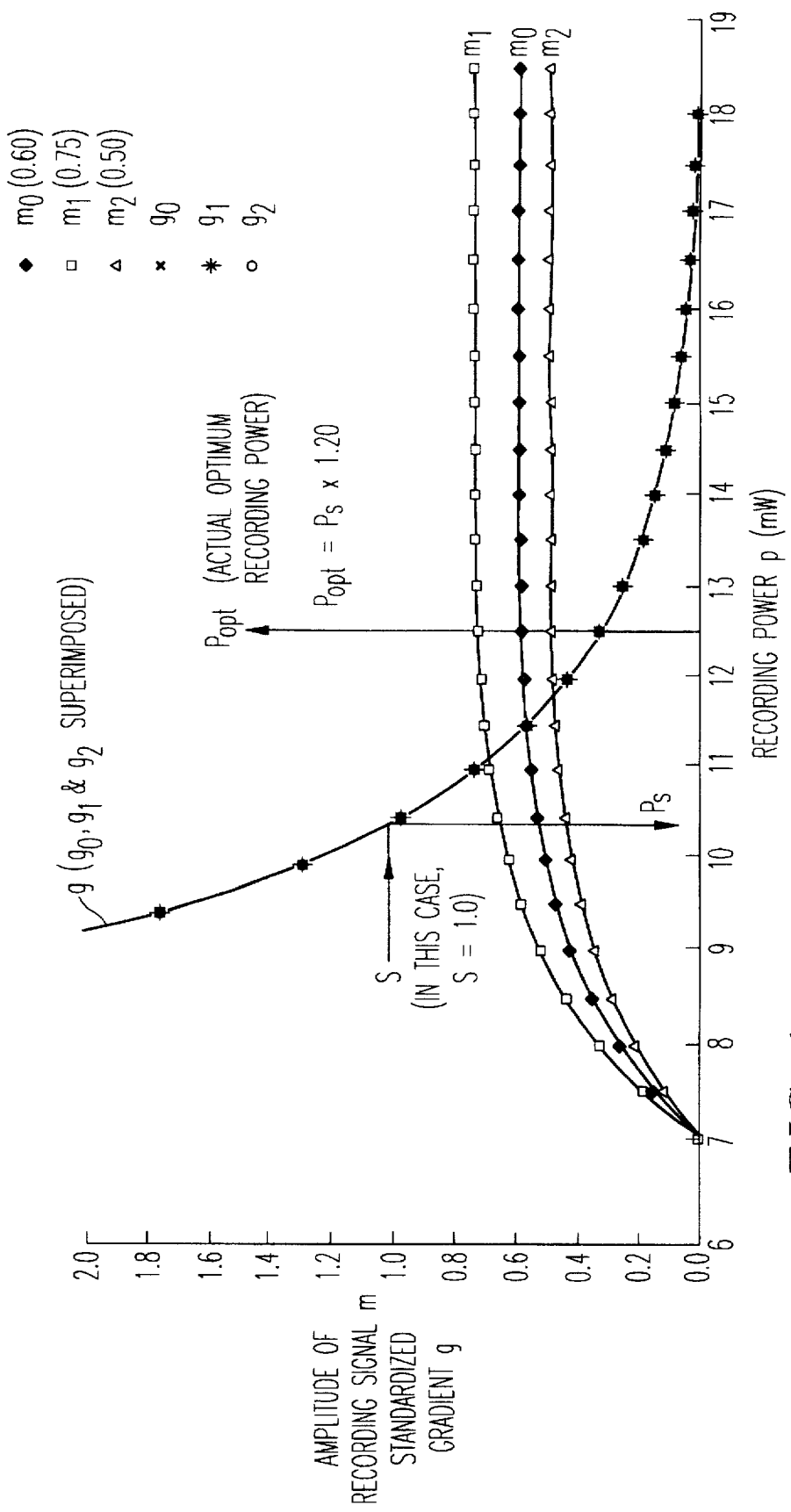
FIG. 4 shows a second example of effects in embodiments of the present invention.

FIG. 4 shows an example of the effects provided in the second embodiment of the invention. In this embodiment, a relation between an amplitude m of a recording signal and a recording power P and a relation between a standardized gradient g and a recording power P are the same as those in the embodiment of the above invention. In the embodiment of the invention, when setting an optimum recording power, in a range of P>13 mW where the amplitude m of the recorded signal is saturated to a recording power, a value of the standardized gradient g itself becomes smaller, and also a change rate to P becomes smaller, so that it is easily affected by external disturbance or noise and a precision in detection of P may become lower. In other words, it is better for improving a precision in detection of P to use a condition where a value of g is large and a change rate of P is also large (where a gradient is large).

FIG. 4 shows an example of effects provided in the embodiment of the present invention in which the specific value S is 1.0. FIG. 4 also shows an effect provided by the method of detecting a recording power Ps at which a value of the standardized gradient g coincides with S in this embodiment. Ps is smaller than an actual optimum recording power Popt, so that Popt is set by multiplying this Ps by 1.20. The particular value of S may be selected from a range from 0.2 to 2.0 so that influence by noise will be negligible, and in this case it is possible to detect a recording power Ps corresponding to a set value S with high precision. Offset of a recording power Ps from the optimum recording power Popt can be checked by previously setting an appropriate value in a range from 1.0 to 1.7 times and by computing the optimum recording power Popt by multiplying Ps by this value. For this reason an optimum recording power can furthermore precisely be set.

As described above, in the embodiment, data is recorded for testing in patterns each including a not-recorded section and a recorded section changing a recording power P from time to time to the data recording medium, the data recorded for testing is reproduced and an amplitude m of recording signal corresponding to a recording power P is monitored, a standardized gradient g(P) is obtained through equation (5) explained above which is:

$$g(P)=(\Delta m/m)(\Delta P/P),$$

wherein ΔP is a minute change rate near P and Δm is a minute change rate corresponding to ΔP near m. A specific value of S is selected from a range from 0.2 to 2.0 is set, a recording power Ps at which the standardized gradient g(P) coincides with the value of S is detected, and an optimum recording power is set by multiplying Ps by a value in a range from 1.0 to 1.7, so that it is possible to furthermore precisely set an optimum recording power and also to reduce a cost of a data recording/reproducing apparatus.

A third embodiment of the invention will now be described. In this embodiment, an optical data recording medium is repeatedly rewritable and recording for testing is executed under the condition that g(P) is 0.15 or more and a track for testing in the optical data recording medium is included within data tracks. As a result, a track exclusive for testing which is unnecessary for a user can be omitted, and also setting precision of the optimum recording power can be improved.

Generally, it has been confirmed experimentally that the recording power does not damage all kinds of optical data recording media thermally if g(P) is 0.15 or more. Therefore in this embodiment, excessive recording power does not irradiate onto a recording film of the optical data recording medium, so that the recording film is not damaged. Thus a track for testing is unnecessary to be formed, and even if recording for testing is executed on a data track where a data is recorded, no problem occurs. Therefore it is achieved that the setting precision of the optimum recording power can be improved.

Concretely, the recording for testing is executed as changing the recording power upward on a data track which is first circle of the data tracks and then data for testing is reproduced from the track where the recording for testing is executed. At that time, if g(P) reaches around 0.15, the recording for testing is stopped. Then the optimum recording power is decided under the condition that g(P) is 0.15 or more as described above. Data starts to be overwritten from the beginning of the first track where the recording for testing is executed. Generally, a recording characteristic is almost the same among tracks around the track where the test recording is executed. Thus, over tracks whose length is one to several hundreds times as long as the length of the track where the recording for testing is executed, or otherwise over whole tracks, a data is recorded in a good condition.

As described above, in this embodiment, the optical data recording medium is repeatedly rewritable and recording for testing is executed under the condition that g(P) is 0.15 or more and the track for testing in the optical data recording medium is included within data tracks. As a result, the track exclusive for testing, which is unnecessary for a user, can be omitted, and also setting precision of the optimum recording power can be improved.

In addition, in the embodiment described above, under the condition that the offset of the recording power is small enough, the offset of the amplitude of recording signal can be reduced by using $h(P)=(\Delta m/m)/\Delta P$ instead of $g(P)=(\Delta m/m)/(\Delta P/P)$, and therefore those embodiments of the invention include the case of $h(P)=(\Delta m/m)/\Delta P$ instead of $g(P)=(\Delta m/m)/(\Delta P/P)$. In this case, with respect to the specific value S which is selected from 0.2 to 2.0, a first specific value is used as so that the amplitude of recording signal does not saturate to the recording power, and with respect to the value of 1.0 to 1.7 a second specific value is properly used.

Furthermore, another embodiment will be described. In this embodiment, in one portion of an optical data recording medium, a recommend or preferred value of at least one of the value of the recording power, g(P), h(P) and the ratio between the optimum recording power and Ps etc., which are for seeking the optimum recording power by the recording for testing, is prerecorded previously.

Generally, the recording power, g(P), h(P) and the ratio between the optimum recording power and Ps etc., which are for seeking the optimum recording power by the recording for testing, have a recommended or preferred value respectively depending on a material of a recording film or structure of the optical data recording medium. Therefore, if each recommended or preferred value is pre-recorded previously in one portion of the optical data recording medium as inherent data and it is reproduced in the optical data recording/reproducing apparatus, the optimum recording power of the optical data recording/reproducing apparatus can be sought precisely by the recording for testing. As examples of the recommended or preferred values, it is preferable that they can be reproduced by the recording/reproducing pickup, for instance, known ones such as modulated pre-pit array, recorded pit array or modulation pattern of bar coding are possible.

As a result, the optimum recording power of the optical data recording medium can be precisely sought by the recording for testing. Therefore the optical data recording media of many companies where the recording characteristic are different can be used widely and so called interchangeability among the optical data recording media can be improved.

As described above, in this embodiment, in one portion of the optical data recording medium, the recommended value of at least one of the value of the recording power g(P), h(P) and the ratio between the optimum recording power and Ps etc., which is for seeking the optimum recording power by the recording for testing, are pre-recorded previously. Therefore the optimum recording power of the optical data recording medium can be precisely sought by the recording for testing. Therefore the optical data recording media of many companies where the recording characteristic are different can be used widely and the interchangeability among the optical data recording media can be improved.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

Obviously, numerous modifications and variations of the present invention are possible in light of the above teachings. It is therefore to be understood that, within the scope of the appended claims the invention may be practiced otherwise than as specifically described herein.

What is claimed as new and is desired to be secured by Letters Patent of the United States is:

1. A method of determining a recording power used in a storage device, comprising the steps of:

determining a plurality of amplitudes of recorded data which correspond to a plurality of different recording powers by writing the recorded data to a storage medium at the different recording powers and determining amplitudes of the recorded data on the storage medium; and calculating a recording power which corresponds to a predetermined ratio of an expression containing an amplitude of said recorded data to an expression containing a recording power used to record said recorded data, wherein the calculating step comprises calculating said ratio which is $(\Delta m/m)/(\Delta P/P)$, where P is a recording power, m is an amplitude of recorded data corresponding to the recording power P, $\Delta P$ is a minute change rate near P, and $\Delta m$ is a minute change rate corresponding to $\Delta P$ near m.

2. A method according to claim 1, further comprising the step of:

controlling the recording power using a result of the calculating step.

3. A method according to claim 2, wherein the controlling step comprises:

controlling the recording power of an optical head of the storage device, using the result of the calculating step.

4. A method according to claim 1, wherein said step of calculating said ratio comprises:

calculating a standardized gradient which is g(P) which is equal to $(\Delta m/m)/(\Delta P/P)$.

5. A method according to claim 1, wherein said calculating step comprises:

calculating the recording power which corresponds to a predetermined ratio which is in a range from 0.2 to 2.0 of an expression containing an amplitude of said recorded data to an expression containing a recording power used to record said recorded data.

6. A method according to claim 5, further comprising the step of:

multiplying the recording power which has been calculated by a value which is in a range from 1.0 to 1.7 to obtain an optimum recording power.

7. A method according to claim 6, further comprising the step of:

recording data using the optimum recording power.

8. A method according to claim 1, wherein said calculating step comprises:

calculating the recording power which corresponds to the predetermined ratio at which the amplitude is not saturated.

9. A method according to claim 8, further comprising the step of:

multiplying the recording power which has been calculated by a value which is in a range from 1.0 to 1.7 to obtain an optimum recording power.

10. A method according to claim 1, wherein the calculating step comprises:

calculating the recording power which corresponds to said predetermined ratio which is greater than or equal to 0.15.

11. A method according to claim 10, wherein:

the writing of the recorded data is to a repeatedly rewritable data recording medium.

12. A method according to claim 1, further comprising the step of:

reading a value to be used as the predetermined ratio from the storage medium.

13. A method according to claim 1, further comprising the steps of:

reading a value, from the storage medium, which is to be multiplied with the recording power which has been calculated; and calculating an optimum recording power by multiplying the the value which has been read with the recording power which has been calculated.

14. A method of determining a recording power used in a storage device, comprising the steps of:

determining a plurality of amplitudes of recorded data which correspond to a plurality of different recording powers by writing the recorded data to a storage medium at the different recording powers and determining amplitudes of the recorded data on the storage medium; and calculating a recording power which corresponds to a predetermined ratio of an expression containing an amplitude of said recorded data to an expression containing a recording power used to record said recorded data, wherein the calculating step comprises calculating said ratio which is $(\Delta m/m)/(\Delta P)$, where P is a recording power, m is an amplitude of recorded data corresponding to the recording power P, $\Delta P$ is a minute change rate near P, and $\Delta m$ is a minute change rate corresponding to $\Delta P$ near m.

15. A method according to claim 14, further comprising the step of:

controlling the recording power using a result of the calculating step.

16. A method according to claim 15, wherein the controlling step comprises:

controlling the recording power of an optical head of the storage device, using the result of the calculating step.

17. A method according to claim 14, wherein said calculating step comprises:

calculating the recording power which corresponds to a predetermined ratio which is in a range from 0.2 to 2.0 of an expression containing an amplitude of said recorded data to an expression containing a recording power used to record said recorded data.

18. A method according to claim 17, further comprising the step of:

multiplying the recording power which has been calculated by a value which is in a range from 1.0 to 1.7 to obtain an optimum recording power.

19. A method according to claim 18, further comprising the step of:

recording data using the optimum recording power.

20. A method according to claim 14, wherein said calculating step comprises:

calculating the recording power which corresponds to the predetermined ratio at which the amplitude is not saturated.

21. A method according to claim 20, further comprising the step of:

multiplying the recording power which has been calculated by a value which is in a range from 1.0 to 1.7 to obtain an optimum recording power.

22. A method according to claim 21, further comprising the step of:

reading a value to be used as the predetermined ratio from the storage medium.

23. A method according to claim 14, further comprising the steps of:

reading a value, from the storage medium, which is to be multiplied with the recording power which has been calculated; and calculating an optimum recording power by multiplying the value which has been read with the recording power which has been calculated.

24. An optical data recording/reproducing method wherein data is recorded for testing in a pattern consisting of a not-recorded section and a recorded section and changing a recording power P onto an optical data recording medium from time to time, an amplitude m of the recorded data corresponding to the recording power P is monitored by reproducing the data recorded for testing; a standardized gradient g(P) is calculated from the following expression:

$$g(P)=(\Delta m/m)/(\Delta P/P)$$

or h(P) is calculated from the following expression:

$$h(P)=(\Delta m/m)/\Delta P$$

wherein $\Delta P$ indicates a minute change rate near P and $\Delta m$ indicates a minute change rate corresponding to $\Delta P$ near m; and an optimum recording power is decided and set by evaluating a recording power corresponding to one of g(P) ot h(P).

25. An optical data recording medium driving apparatus using an optical data recording medium comprising:

a recording/reproducing pickup which records data for testing in patterns each including of a not-recorded section and a recorded section as changing a recording power P from time to time to the optical data recording medium and reproduces the data therefrom;

an optical source driving device which drives an optical source in the recording/reproducing pickup;

a recording power setting device which sets the recording power P for testing and an optimum recording power to the recording/reproducing pickup;

a monitoring device which monitors an amplitude m of recorded data corresponding to the recording power P from the recording/reproducing pickup;

a calculating device which calculates a standardized gradient g(P) or h(P) by the recording power P for testing, the amplitude m of the recorded data and the following expression:

$$g(P) = (\Delta m/m)/(\Delta P/P)$$

or $$h(P) = (\Delta m/m)/\Delta P$$

wherein $\Delta P$ is a minute change rate near P and $\Delta m$ is a minute change rate corresponding to $\Delta P$ near m; and a recording controlling device which decides the optimum recording power by evaluating excess or shortage of the recording power according to the standardized gradient g(P) or h(P) calculated in the calculating device and sets the optimum recording power to the recording power setting device.

26. A recording medium comprising:

a portion on which a recommended or preferred value of at least one of a value of a recording power P, a standardized gradient g(P), a ratio h(P), and a ratio between an optimum recording power Popt and a recording power Ps corresponding to a given signal level S, wherein:

g(P) is equal to $(\Delta m/m)/(\Delta P/P)$;

m is an amplitude of recorded data corresponding to the recording power P;

$\Delta P$ is a minute change rate near P;

$\Delta m$ is a minute change rate corresponding to $\Delta P$ near m; and h(P) is equal to $(\Delta m/m)/(\Delta P)$, said recommended or preferred value being used to determine the recording power for the recording medium.

27. The recording medium according to claim 26, wherein said recommended or preferred value is recorded on said portion as inherent data which is inherent in a material or a structure of the recording medium.

28. The recording medium according to claim 26, wherein said recording medium is an optical recording medium.

29. A recording medium comprising:

a portion of recorded data having a value of at least one of a recording power P, a standardized gradient g(P), a ratio h(p), and a ratio between an optimum recording power Popt and a recording power Ps corresponding to a given signal level S, wherein:

g(P) is equal to $(\Delta m/m)/(\Delta P/P)$;

m is an amplitude of recorded data corresponding to the recording power P;

$\Delta P$ is a minute change rate near P;

$\Delta m$ is a minute change rate corresponding to $\Delta P$ near m; and h(P) is equal to $(\Delta m/m)/(\Delta P)$, said value determines the recording power for the recording medium.

30. The recording medium according to claim 29, wherein said portion comprises pre-recorded data including at least one of said values.

31. The recording medium according to claim 29, wherein said recording medium comprises an optical recording medium.

* * * * *